United States Patent
Jeantilus et al.

(10) Patent No.: US 7,024,090 B2
(45) Date of Patent: Apr. 4, 2006

(54) OPTICAL FIBER ARRAY WITH VARIABLE FIBER ANGLE ALIGNMENT AND METHOD FOR THE FABRICATION THEREOF

(75) Inventors: Arden Jeantilus, Orange, NJ (US); David W. Sherrer, Fairlawn, VA (US)

(73) Assignee: Shipley Company, L.L.C., Marlborough, MA (US)

(*) Notice: Subject to any disclaimer, the term of this patent is extended or adjusted under 35 U.S.C. 154(b) by 0 days.

(21) Appl. No.: 10/492,281

(22) PCT Filed: Sep. 26, 2002

(86) PCT No.: PCT/US02/30476

§ 371 (c)(1),
(2), (4) Date: Apr. 9, 2004

(87) PCT Pub. No.: WO03/027734

PCT Pub. Date: Apr. 3, 2003

(65) Prior Publication Data

US 2004/0234226 A1 Nov. 25, 2004

Related U.S. Application Data

(60) Provisional application No. 60/325,043, filed on Sep. 26, 2001.

(51) Int. Cl.
*G02B 6/00* (2006.01)

(52) U.S. Cl. .......................... 385/137; 385/39; 385/52
(58) Field of Classification Search ................ 385/115, 385/116, 120, 137

See application file for complete search history.

(56) References Cited

U.S. PATENT DOCUMENTS

| 5,135,590 A | 8/1992 | Basavanhally et al. |
| 5,170,455 A | 12/1992 | Goossen et al. |
| 5,185,846 A | 2/1993 | Basavanhally et al. |

(Continued)

FOREIGN PATENT DOCUMENTS

JP 10171384 6/1998

(Continued)

*Primary Examiner*—Frank G. Font
*Assistant Examiner*—Michael P. Mooney
(74) *Attorney, Agent, or Firm*—Jonathan D. Baskin (57) ABSTRACT

A fiber optic array (90) is provided having fibers (24) positioned at a selected angle relative to the output face of the array. The array includes first (20) and second (30) substrates each of which has a plurality of fiber passageways extending therethrough. The substrates are positioned relative to one another such that each passageway (22) of the first substrate is registered to a respective passageway (32) of the second substrate. An optical fiber is disposed in each pair of registered passageways. The passageways are dimensioned to permit the optical fiber disposed therein to be positioned at a range of angles relative to the output face of the array. The first and second substrates are moved relative to one another to select an angle from the range of angles at which the fibers are oriented relative to the output face of the array. A method for fabricating such a fiber optic array is also provided.

14 Claims, 6 Drawing Sheets

U.S. PATENT DOCUMENTS

| | | |
|---|---|---|
| 5,259,054 A | 11/1993 | Benzoni et al. |
| 5,337,384 A | 8/1994 | Basavanhally et al. |
| 6,215,946 B1 | 4/2001 | Sherrer |
| 6,320,997 B1 | 11/2001 | Dautartas et al. |
| 6,393,187 B1 * | 5/2002 | Engelberth et al. ......... 385/115 |
| 6,396,995 B1 | 5/2002 | Stuelpnagel et al. |
| 6,408,120 B1 | 6/2002 | Dautartas |
| 6,522,817 B1 * | 2/2003 | Moran ................. 385/120 |
| 6,621,976 B1 | 9/2003 | Han et al. |
| 6,721,479 B1 | 4/2004 | Lasecki et al. |
| 2001/0051028 A1 | 12/2001 | Gutierrez et al |
| 2002/0131752 A1 | 9/2002 | Boudreau et al. |
| 2002/0154882 A1 | 10/2002 | Moran |

FOREIGN PATENT DOCUMENTS

| | | |
|---|---|---|
| WO | WO/02/099489 | 12/2002 |

\* cited by examiner

OPTICAL FIBER ARRAY WITH VARIABLE FIBER ANGLE ALIGNMENT AND METHOD FOR THE FABRICATION THEREOF

RELATED APPLICATIONS

This application is a National Stage of International Application No. PCT/US02/30476, filed Sep. 26, 2002, which claims the benefit of priority of U.S. Provisional Application 60/325,043, filed on Sep. 26, 2001, the entire contents of which application(s) are incorporated herein by reference.

FIELD OF THE INVENTION

The present invention relates generally to fiber arrays and in particular to fiber arrays comprising two or more substrates that may be oriented at a range of positions relative to one another so as to select the angle at which the optical fibers are oriented relative to the output face of the fiber array.

BACKGROUND OF THE INVENTION

The use of multiple optical channels, such as optical fibers, has become prevalent in applications ranging from communications to optical computing in response to a need for increased system bandwidth. In such multi-channel applications, a fiber array provides a desirable way for handling multiple optical fibers while attempting to effect control of positioning among the fibers. At the same time, providing precise positioning of a plurality of fiber cores relative to one another is critical to achieving acceptable system performance, since the fiber cores must be precisely registrable to other devices or fibers of the system. Without precise registration between the signal-carrying portion of the fiber, i.e., the fiber core, and other optical components, unacceptably large variation or degradation in optical performance may result. In this regard, mere movement or misalignment between fiber cores on the sub-micron scale may give rise to unacceptable performance degradation such as that caused by coupling loss and insertion loss. For example, single mode fibers presently in use typically have a core of 5 microns in diameter. Thus, movement or misalignment of the optical core by even 1 micron represents movement or misalignment by a substantial fraction of the core diameter.

A fiber array may find application in a number of optical computing and data communication applications, such as use as a component of a free-space optical switch. The need for optical switching to provide selective routing of information, without conversion of the optical signal into an electrical signal and back to an optical signal, is becoming increasingly important in optical data networks. To meet this need, a free space optical switch takes optical signals output from a first array of fibers and optically manipulates the signals so as to route the signals into a second array of fibers to effect a switching function. In such a system, routing can only be performed effectively when the relative locations among the fibers of an array are sufficiently precisely controlled. Moreover, as such systems include a greater number of fibers, the precision and tolerances with which each fiber must be positioned relative to neighboring fibers becomes more critical in order to achieve the overall required system performance.

Hence, for reasons such as these there remains a need for optical fiber arrays in which fibers can be precisely and reliably secured relative to one another and to a supporting substrate.

SUMMARY OF THE INVENTION

In accordance with the present invention a fiber optic array is provided in which the fibers may be positioned at a selected angle relative to the output face of the array. The array includes a first substrate which has first a plurality of fiber passageways extending therethrough. The array also includes a plurality of optical fibers with each fiber disposed in a respective passageway of the first substrate. Each passageway may be dimensioned to permit the optical fiber disposed therein to be positioned at a range of angles relative to a selected surface of the substrate. The selected surface may be, for example, the output face of the array.

The array also includes a second substrate which has a second plurality of fiber passageways extending therethrough. The passageways of the second substrate may be dimensioned to permit the optical fibers disposed therein to be positioned at a range of angles relative to a selected surface of the second substrate. The second substrate is positioned relative to the first substrate so that each passageway of the first substrate is registered to a respective passageway of the second substrate. The registered passageways provide fiber pathways through the first and second substrates for holding and orienting the fibers. Each pathway has a longitudinal axis oriented at a selected angle relative to the selected surface of the first substrate. The angle of the pathway may be determined by the location of the second substrate relative to the first substrate. Each of the optical fibers is disposed in a respective pathway, whereby the fibers are oriented at the selected pathway angle relative to the selected surface of the first substrate. Thus, the angular orientation of the fibers relative to the selected surface, e.g., the output face of the array, may be determined by the relative locations of the first and second substrates.

In accordance with another aspect of the invention, a method for fabricating such a fiber optic array is provided. The method includes a step of providing a first substrate that has a first plurality of fiber passageways extending therethrough. The method also includes a step of providing a second substrate that has a second plurality of fiber passageways extending therethrough. A positioning step is also provided whereby the second substrate is positioned relative to the first substrate so that each passageway of the first substrate is registered to a respective passageway of the second substrate. The method further includes a step of placing an optical fiber in each of the registered passageways, wherein the passageways are dimensioned to permit the optical fibers disposed therein to be positioned at a range of angles relative to a selected surface of the first substrate. In addition, the method includes a step of moving the second substrate relative to the first substrate so as to orient the fibers at a selected angle within the range of angles, whereby a fiber array is provided in which the fibers are oriented at the selected angle relative to the selected surface of the first substrate.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Broadly stated, the present invention relates to fiber optic arrays in which the angular orientation of the optical fibers relative to the output face of the array can be selected. The arrays include two substrates each having fiber passageways extending therethrough. An optical fiber extends through each passageway of the first substrate and a respective passageway of the second substrate. The passageways of the substrates are dimensioned so that the fibers may be oriented within each passageway at a range of angles. By orienting the first substrate at a first selected location relative to the second substrate, the fibers may be oriented within the array at a first selected angle relative to the output face of the fiber array. In addition, by orienting the first substrate at a second selected location relative to the second substrate, the fibers may be oriented within the array at a different, second selected angle relative to the output face of the fiber array. Thus, a variety of optical arrays can be fabricated each with a different angular orientation of the optical fibers.

Referring now to the figures, wherein lice elements are numbered alike throughout, embodiments of fiber arrays in accordance with the present invention are illustrated. In particular, referring to FIG. 1, a substrate or mounting plate 10 for use in an array of the present invention is illustrated. An array of the present invention typically includes two or more such mounting plates 10. Discussion begins with a description of a single mounting plate. Subsequently, the structure of an array of the present invention that incorporates three mounting plates 10 is provided.

Figure 1:
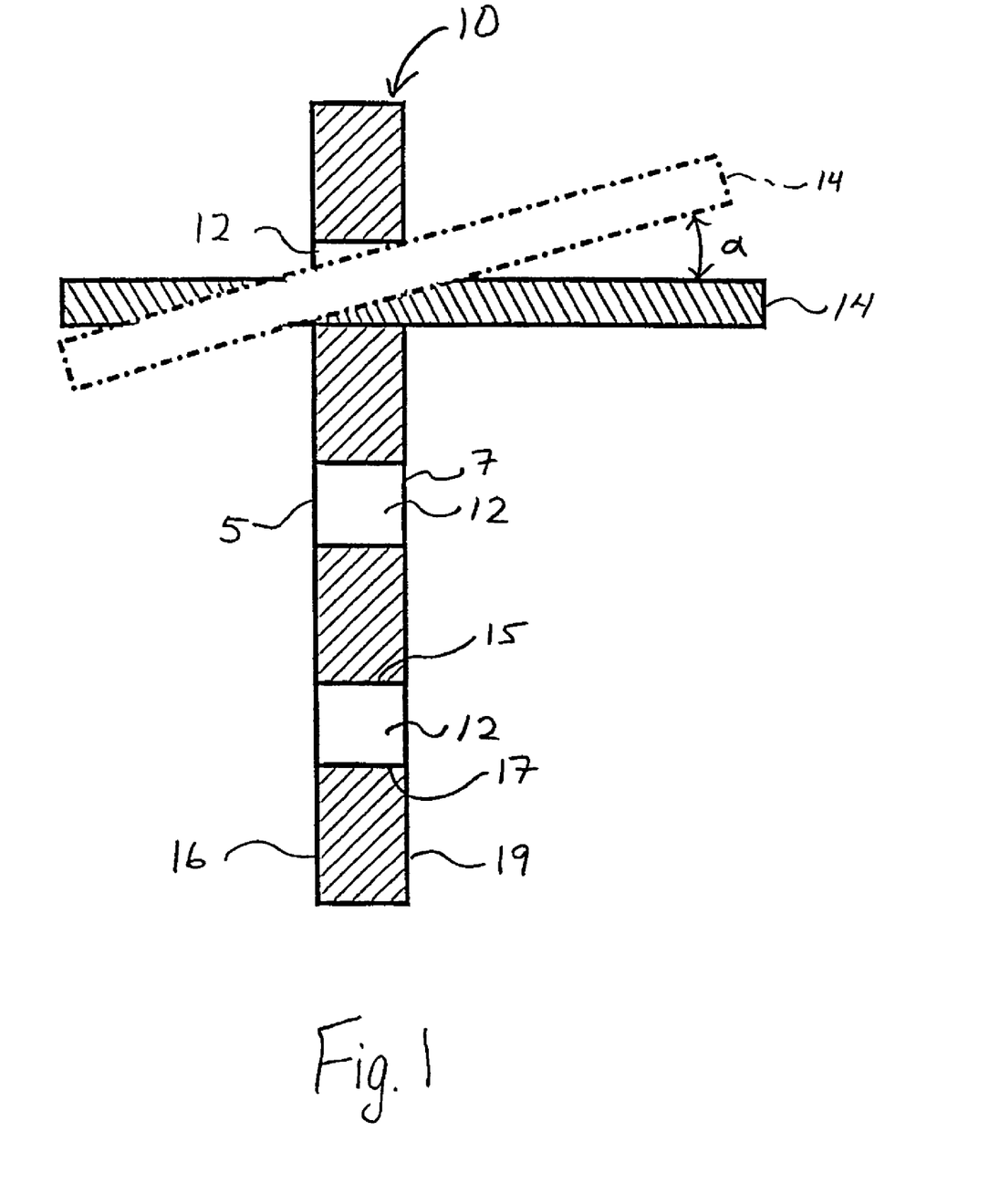
FIG. 1 schematically illustrates a substrate having passageways dimensioned to permit an optical fiber to be positioned within each passageway at a range of angles relative to a selected surface of the substrate.

The mounting plate 10 is illustrated as having an overall generally rectangular solid shape. Although the shape of the mounting plate 10 is depicted as a rectangular solid, other shapes may be utilized. For example, opposing surfaces 16, 19 of the mounting plate 10 may be non-parallel to one another. A plurality of passageways 12 are provided in the mounting plate 10 and extend through the mounting plate 10 to terminate at openings 5, 7 at opposing surfaces 16, 19 of the mounting plate 10 to provide through-holes in which optical fibers 14 may be placed. The passageways 12 may be provided as a linear array of passageways 12. Alternatively, a grid of passageways 12 may be provided for use in an N×N array. The passageways 12 include sidewalls 15, 17 which may be perpendicular to the output face 16 of the mounting plate 10, as illustrated in FIG. 1. Alternatively, the sidewalls 15, 17 may be oriented at an angle relative to the output face 16 of the mounting plate 10.

The passageways 12 are dimensioned to permit an optical fiber 14 disposed within the passageway 12 to be positioned at a range of angles up to α, e.g., from 0 to 12°, such as 0°, 8° or from 4 to 8°, relative to the output face 16 of the mounting plate 10. For example, each end 5, 7 of the passageway 12 may have a cross-sectional dimension that is larger than the diameter of the fiber 14 to provide clearance between the passageway sidewalls 15, 17 and the fiber 14 at the passageway ends 5, 7. Moreover, for ease of assembly, it may be particularly desirable to provide clearance between the sidewalls 15, 17 of the passageway 12 and the fiber 14 along the entire length of the passageway 12. Thus, the dimensions, e.g., length and height, of the passageway 12 are selected with regard to the diameter of the fiber 14 disposed within the passageway 12. However, the diameter of the fiber 14 depends on the portion of the fiber 14 used.

Typically an optical fiber includes an inner core surrounded by a cladding which is enclosed within an optional buffer and an outer jacketing. To increase the packing density of a fiber array, only the core and cladding are needed within the passageways 12. In certain applications, only the optical core may be needed. The buffer and jacketing, which are typically provided around the cladding, provide structural support for the core and cladding but perform no optical function. Therefore, removal of the jacketing and buffering can increase the packing density. For example, a single mode fiber with a 5 micron core can have a jacketing diameter of 250 microns and cladding diameter of 125 microns. Removal of the jacketing and any buffer decreases the diameter of the fiber from 250 microns to 125 microns permitting an increase in the linear packing density by a factor of 2. Thus, it may be particularly desirable to utilize un-jacketed, un-buffered optical fibers 14 in the mounting plate 10. Alternatively, in selected applications it may be desirable to leave a portion of the buffer, jacketing, or both on portions of the optical fibers 14 that are positioned within the mounting plate 10. For optical fibers 14 having a diameter of 125 microns, the passageways 12 may desirably have a cross-sectional dimension ranging from 130 microns to 200 microns, for example, to provide clearance of 5 to 75 microns between the clad fiber and the sidewall 15 of the passageway 12.

The mounting plate 10 may be formed of suitable materials having sufficient structural strength and in which features having the above-described dimensions can be formed. In addition, the mounting plate 10 may desirably comprise a material having a coefficient of thermal expansion that is similar to that of the fibers 14. Providing a mounting plate 10 having a coefficient of thermal expansion sufficiently matched to that of the optical fibers 14 can lead to improved stability of the fiber array relative to temperature changes. Examples of materials suitable for use in the mounting plate 10 include glass, photo-imagable glass, ceramic, metal, fused silica, silicon, thermoset resin, ZERODUR® and combinations thereof. In particular, the mounting plate 10 may be conveniently provided as a silicon substrate.

A single crystal silicon substrate is particularly convenient, because the silicon substrate may be processed at the wafer level to simultaneously produce multiple mounting plates 10 using well-established manufacturing techniques. As described below multiple mounting plates 10 are used in fiber arrays of the present invention. In particular, techniques, such as reactive ion beam etching (RIE), may be utilized to form the passageways 12 in the substrate. Moreover, the silicon substrate may be anisotropically etched to provide registration features having planar sidewalls formed by the precisely defined crystallographic planes of the silicon. For example, the {111} silicon plane is known to etch more slowly than the {100} or {110} planes with proper choice of etchant. Thus, registration features, such as V-grooves or V-pits, may be formed comprising walls that are {111} crystallographic planes. The registration features may be provided in a selected surface of the silicon mounting plate 10, such as the output face 16, so that the mounting plate 10 may be registered to other optical elements via the registration features. In addition, V-grooves may be placed proximate an end 5, 7 of the passageways 12 to contain registration elements, such as a registration fiber, that assist in positioning the fiber 14 at a selected location within the passageway 12. The use of multiple mounting plates 10 to provide an array in accordance with the present invention is illustrated in the remaining figures.

Figure 2:
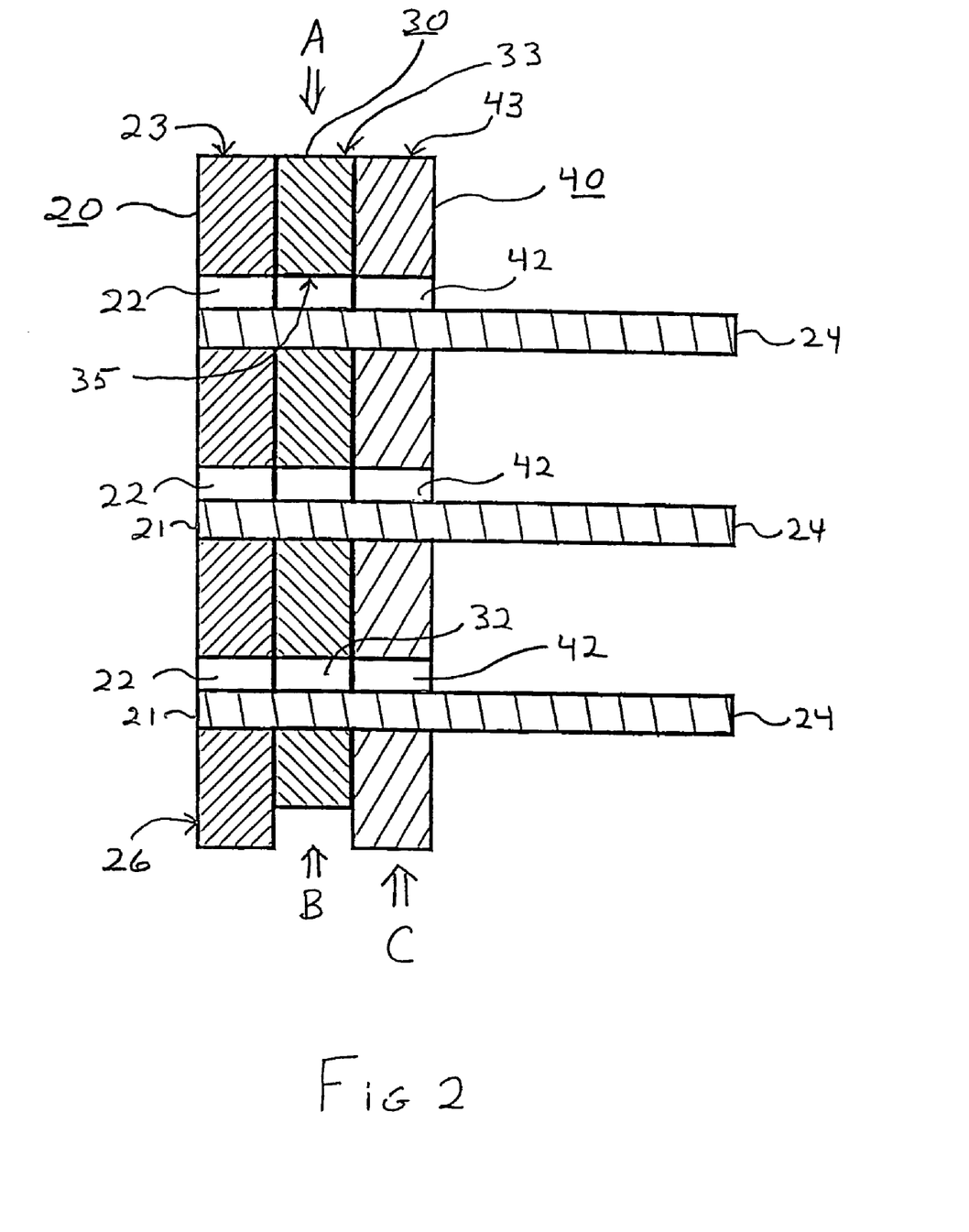
FIG. 2 schematically illustrates three substrates of the type illustrated in FIG. 1, where passageways of the substrates are aligned to one another to provide pathways through the three substrates into which the fibers may be readily inserted.
Figure 3:
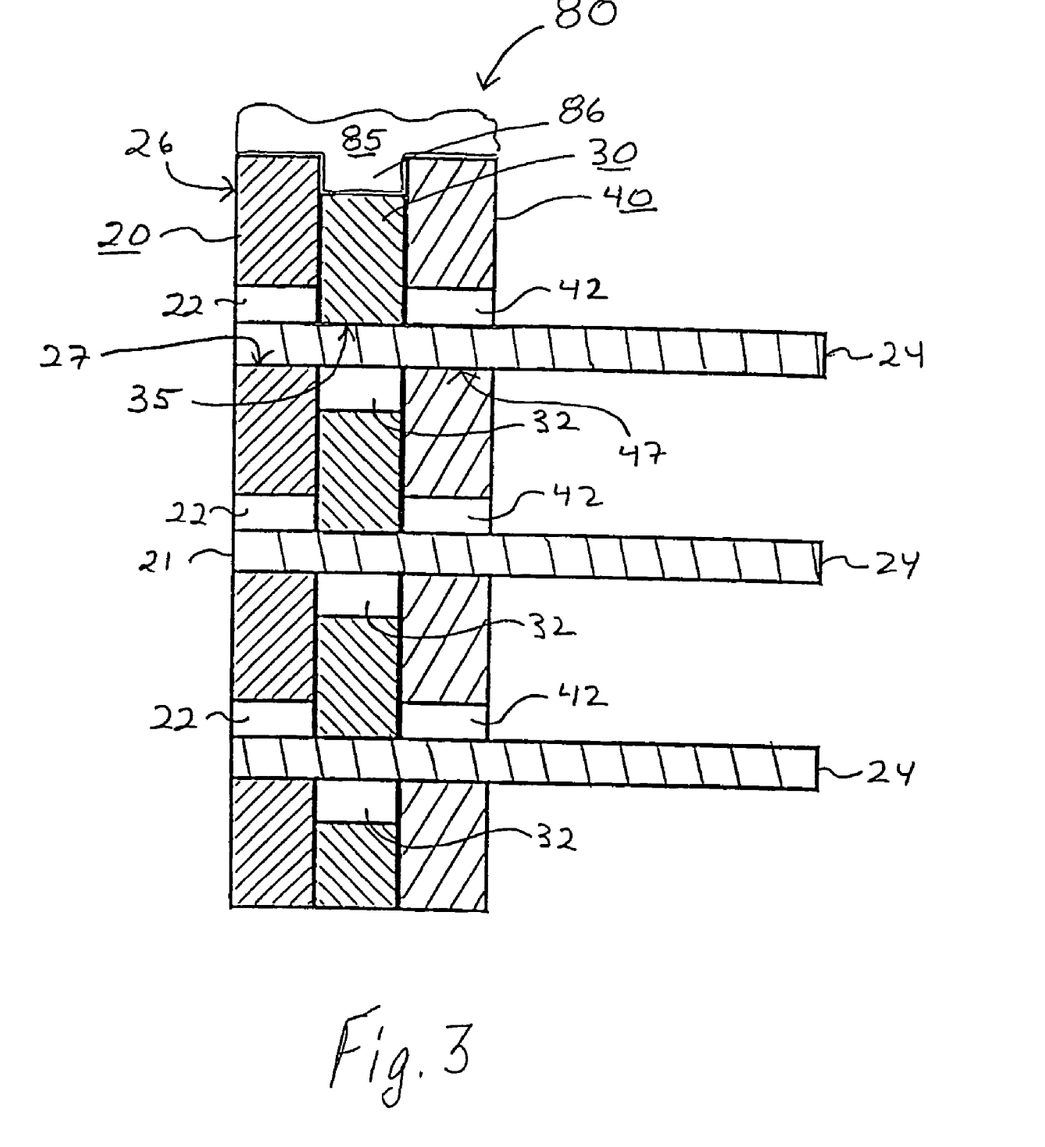
FIG. 3 schematically illustrates the three substrates of FIG. 2 but with the central substrate translated relative to the other two substrates so that the upper surfaces of the passageways of the central substrate press the optical fibers against the lower surfaces of the adjacent passageways of the outer two substrates.

In particular, turning now to FIGS. 2 and 3, an array 80 in accordance with the present invention is illustrated. The array 80 comprises three mounting plates 20, 30, 40 having passageways 22, 32, 42 for receiving optical fibers 24. The mounting plates 20, 30, 40 are similar in configuration to the mounting plate 10 illustrated in FIG. 1. While three mounting plates 20, 30, 40 are shown, it shall be appreciated from a further reading of the specification that an array of the present invention may include as few as two plates. Moreover, the passageways 22, 32, 42, while shown to have similar shapes, need not all be similarly shaped. For example, the passageways 22, 32, 42 may include shapes such as cylindrical, rectangular, conical, pyramidal, or other suitable shapes. However, the passageways 22, 32, 42 should be dimensioned to permit an optical fiber 24 disposed within the passageway 22, 32, 42 to be positioned at a range of angles within the passageways 22, 32, 42. In particular, each end of a passageway 22, 32, 42 may have a cross-sectional dimension that is larger than the diameter of the fiber 24 to provide clearance for the fiber 24 at the passageway ends. Clearance between the passageway 22, 32, 42 and the fiber 24 along the entire length of the passageway 12 may also be desirable and may provide for ease of assembly of the fiber array 80, as illustrated in FIG. 2.

FIG. 2 illustrates an initial position of the mounting plates 20, 30, 40 relative to one another which is particularly well-suited for introducing the optical fibers 24 into the passageways 22, 32, 42 of the mounting plates 20, 30, 40. In particular, the mounting plates 20, 30, 40 are positioned adjacent one another so that the passageways 22, 32, 42 are substantially aligned to provide channels extending through the mounting plates 20, 30, 40. To facilitate the alignment of the passageways 22, 32, 42, the mounting plates 20, 30, 40 may be configured so that alignment of selected external surfaces of the mounting plates, such as upper surfaces 23, 33, 43, effects alignment of the passageways 22, 32, 42.

The mounting plates 20, 30, 40 may be placed in facing contact as illustrated in FIG. 2. Alternatively, the mounting plates 20, 30, 40 may be disposed in spaced apart relation and may include spacer elements therebetween to provide gaps between the mounting plates 20, 30, 40. For example, the spacer elements may include a roller element, such as a ball lens, and may reside within recessed features such as V-grooves or V-pits formed in facing surfaces of the mounting plates 20, 30, 40. Such gaps may desirably provide an opening through which a bonding material may subsequently be introduced into the array 80 to secure the fibers 24 in place and to secure the mounting plates 20, 30, 40 to one another. In addition, the gaps and roller elements may facilitate the movement of one or more of the mounting plates 20, 30, 40 from their initial position to their final position in the assembled array 80.

The central mounting plate 30 may be moved relative to the outer mounting plates 20, 40 along the direction of the arrow labeled "A" in FIG. 2 to position or securely hold the fibers 24 within the array 80 at a specified angle relative to the output face 26 of the array 80. For the configuration shown in FIG. 3, the specified angle is substantially perpendicular to the output face 26 of the array 80. The central mounting plate 30 is moved a sufficient amount so that an upper sidewall portion 35 of a passageway 32 of the central mounting plate 30 contacts the fiber 24 and pushes the fiber 24 into contact with lower sidewall portions 27, 47 of adjacent passageways 22, 42 in the two outer mounting plates 20, 40. Movement of the central mounting plate 30 may be assisted by pushing on the central mounting plate 30 with a tool 85 having a raised portion 86 that is dimensioned to push the central mounting plate 30 a desired distance. Optionally, the tool 85 may take the form of a housing which is included in the final assembled array 80. Additionally, or alternatively, the mounting plates 20, 30, 40 may be configured so that alignment of selected external surfaces of the mounting plates, such as lower surfaces 29, 39, 49, effects engagement of the respective upper and lower sidewall portions 37, 27, 47 with the fibers 24 so as to position or securely hold the fibers 24 at the specified angle within the array 80.

Figure 4A:
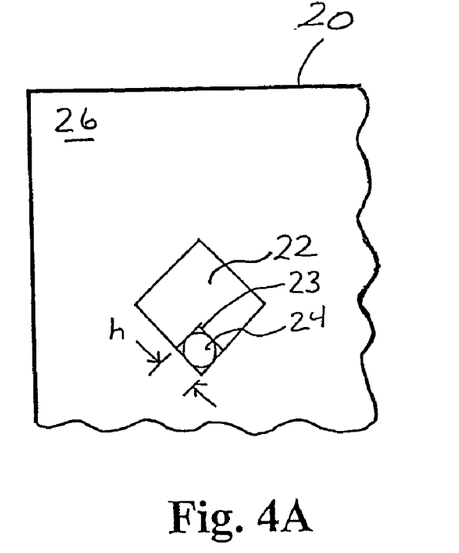
FIG. 4A schematically illustrates a front view of a portion of the fiber array of FIG. 3 having square shaped passageways closed onto the fiber to hold the fiber in the array.
Figure 4B:
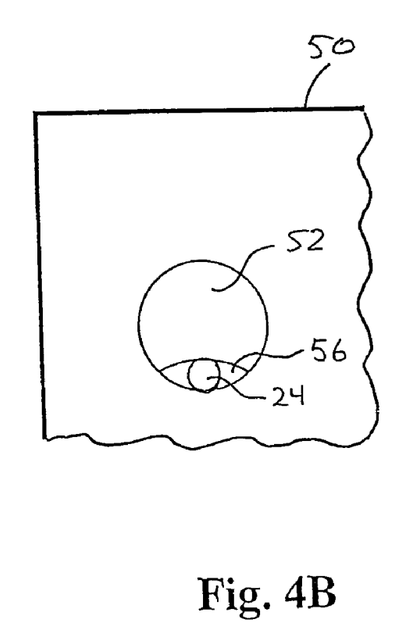
FIG. 4B schematically illustrates a front view of a portion of a fiber array having circular passageways closed onto one another to hold the fiber in the array.

The passageways 22, 32, 42 are selected to have shapes that provide upper sidewall portions 35 and lower sidewall portions 27, 47 that are suited to positioning and retaining the optical fibers 24 therebetween. For example, as shown in FIGS. 4A and 4B, square or circular cross-sectional passageway shapes are suitable. FIG. 4A illustrates a front view of a portion of the output face 26 of the fiber array 80 depicted in FIG. 3 showing passageways 22, 32 having a square cross-sectional shape. The square cross-sectional shape may be particularly desirable, because such a shape provides two-point linear contact between the fiber 24 and the sidewalls of the passageways 22, 32, 42. Alternatively, as illustrated in FIG. 4B, the passageways 52, 56 may have a circular cross-sectional shape. With the passageways 22, 32, 42 so positioned against the fibers 24, pathways having a cross-sectional dimension substantially matched to the diameter of the fibers 24 are provided through the mounting plates 20, 30, 40. For example, as illustrated in FIG. 4A, the pathway has a cross-sectional dimension "h" defined by the overlapping regions of adjacent passageways 22, 32, 42 to provide the pathway through the mounting plates 20, 30, 40.

Once the fibers 24 are retained within the array 80 at the desired specified angle, the optical fibers 24 and mounting plates 20, 30, 40 may be fixed in position relative to one another by introduction of a bonding agent between the fibers 24 and the mounting plates 20, 30, 40. In particular, it may be desirable to introduce a sufficient quantity of bonding agent to substantially fill the voids around the fibers 24 within the passageways 22, 32, 42 to promote secure attachment of the fibers 24 to the mounting plates 20, 30, 40. Providing a bonding agent in the passageways 22 proximate the output face 26 of the array 80 may be particularly desirable if the fiber endfaces 21 proximate the output face 26 are to be polished in situ after the array 80 is assembled. The bonding agent may comprise any material suited to securing the fibers 24 and the mounting plates 20, 30, 40 to one another in a sufficiently durable manner so as to withstand the environmental conditions to which the assembled array 80 is expected to be subjected. Examples of suitable bonding materials include epoxies, ceramic based cements or adhesives, and glass frit.

Figure 5:
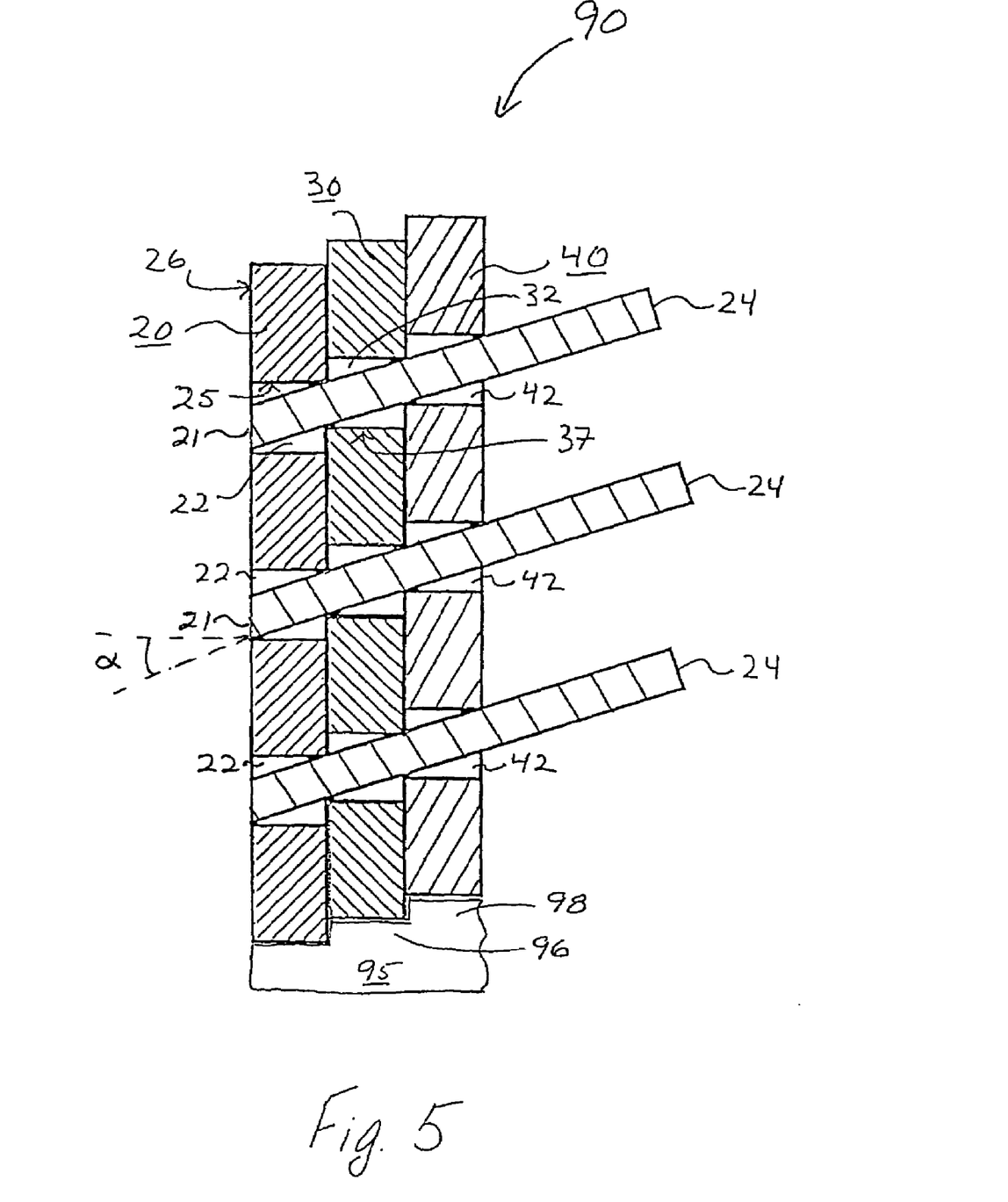
FIG. 5 schematically illustrates the three substrates of FIG. 2 but with the substrates translated relative to one another so that the passageways provide angled pathways through the three substrates to provide a fiber array in which the fibers are oriented at an angle relative to the output face of the fiber array.

A particular advantage of the present invention is that an initial configuration of the mounting plates 20, 30, 40, such as that shown in FIG. 2, may be rearranged differently to provide array configurations in which the angle, α, of the fibers 24 relative to the output face 26 of the array 80 has a different selected value determined by the specific arrangement of the mounting plates 20, 30, 40. For example, referring again to FIG. 2, the right-most mounting plates 30, 40 may be moved relative to one another along the direction of the arrows labeled "B" and "C" in FIG. 2 to position or securely hold the fibers 24 within the array 80 at a specified angle inclined relative to the output face 26 of the array 90, as shown in FIG. 5.

The right-most mounting plates 30, 40 are moved a sufficient amount so as to provide an angled pathway through the mounting plates 20, 30, 40 in which the fibers 24 are positioned. The fibers 24 are retained within the array 90 between opposing sidewall portions of adjacent passageways, such as between the upper sidewall portion 25 of the passageway 22 and the lower sidewall portion 37 of the passageway 32. Movement of the right-most mounting plates 30, 40 may be assisted by pushing on the right-most mounting plates 30, 40 with a tool 95 having raised portions 96, 98 dimensioned to push the right-most mounting plates 30, 40 desired amounts. Optionally, the tool 95 may take the form of a housing which is included in the final assembled array 90. Additionally, or alternatively, the mounting plates 20, 30, 40 may be configured so that alignment of selected external surfaces of the mounting plates effects the desired alignment of the mounting plates 20, 30, 40. The optical fibers 24 and mounting plates 20, 30, 40 may be fixed in position relative to one another by introduction of a bonding agent between the fibers 24 and the mounting plates 20, 30, 40 that may substantially fill the voids around the fibers 24. Since each fiber 24 has an endface 21 that is parallel to the output face 26 of the array 90 and since the optical axis of each fiber 24 is inclined relative to the output face 26, the endface 21 of each fiber 24 is angled relative to the optical axis of the fiber 24. Such an angled endface 21 can be oriented at a selected angle so as to the lessen the return loss at the fiber endface 21.

Figure 6:
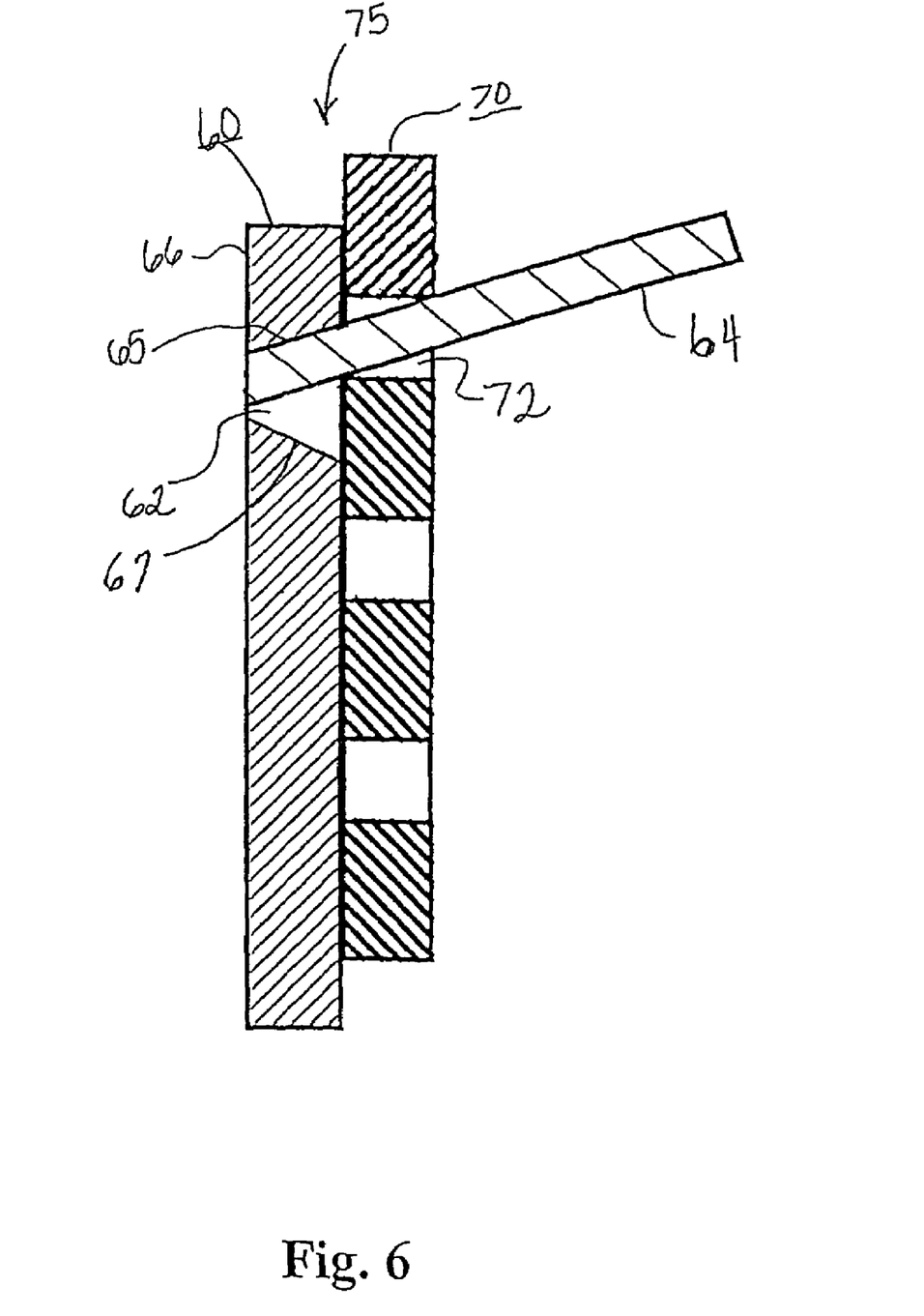
FIG. 6 schematically illustrates a portion of an optical fiber array in which a passageway of one of the substrates has a cross-sectional dimension that increases along the length of the passageway.

Yet another configuration of a fiber array 75 in accordance with the present invention is illustrated in FIG. 6. The fiber array 75 includes two mounting plates 60, 70 having passageways 62, 72 in which an optical fiber 64 is oriented. The mounting plates 60 include passageways 62 having sidewalls 65, 67 that are inclined with respect to the output face 66 of the array 75. Similar to the array 90 of FIG. 5, the mounting plates 60, 70 are oriented relative to one another to provide a pathway for the fiber 64 that is angled with respect to the output face 66 of the array 75. The array 75 may be assembled from materials and in a manner similar to those described above with reference to the arrays 80, 90 of FIGS. 3 and 5.

From the above description of the manner in which the array elements are positioned, a method for assembling an array in accordance with a method of the present invention is indicated. The method includes providing a first substrate 20 that has a first plurality of fiber passageways 22 extending therethrough. A second substrate 30 that has a second plurality of fiber passageways 32 extending therethrough is also provided. The first and second substrates 20, 30 are positioned relative to one another so that each passageway 22 of the first substrate 20 is registered to a respective passageway 32 of the second substrate 30. The registered passageways 22, 32 may be partially or substantially aligned. In particular, the passageways 22, 32 maybe aligned to maximize the clearance for placement of fibers 24 through the registered passageways 22, 32 to aid in the placement of the fibers 24 in the registered passageways 22, 32. An optical fiber 24 is placed in each of the passageways. The fibers 24 may be placed in the passageways 22, 32 after the passageways 22, 32 are registered to one another. Alternatively, the fibers 24 may first be placed in the passageways of one of the substrates and then the passageways of the other substrate may be registered to that substrate. Once the fibers 24 are placed in registered passageways 22, 32 the first and second substrates 20, 30 may be moved relative to one another so as to provide a fiber array 80, 90 in which the fibers 24 are oriented at a selected angle relative to the output face 26 of the array 80, 90. A bonding material may be applied to the substrates 20, 30 and the fibers 24 to bond the fibers 24 and the substrates 20, 30 together. Optionally, the output face 26 of the array may be polished to attain a desired face finish on the fiber endface 21 disposed at the output face 26.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. For example, although the fibers have been disclosed as having a circular cross-sectional shape, fibers with other shapes can be utilized in accordance with the present invention. In addition, though the fibers are shown as discrete elements, the fibers may be provided in the form of a fiber ribbon, if desired. It should therefore be understood that this invention is not limited to the particular embodiments described herein, but is intended to include all changes and modifications that are within the scope and spirit of the invention as set forth in the claims.

What is claimed is:

1. A fiber array comprising:
    a plurality of optical fibers;
    a first silicon substrate comprising a first plurality of fiber passageways extending therethrough from a first surface of the substrate;
    a second silicon substrate comprising a second plurality of fiber passageways extending therethrough, wherein each of the optical fibers is disposed in a respective passageway of the first and second substrates; and
    a bonding agent to secure the fibers and substrates in fixed relation to one another;
    wherein the fibers are oriented at a selected, non-perpendicular angle relative to the first surface of the substrate, and wherein the first silicon substrate provides two-point contact between the fibers and the respective passageways of the first silicon substrate.

2. A fiber array comprising:
a plurality of optical fibers;
a first silicon substrate comprising a first plurality of fiber passageways extending therethrough from a first surface of the substrate, wherein each of the passageways of the first substrate comprises a cylindrical sidewall;
a second silicon substrate comprising a second plurality of fiber passageways extending therethrough, wherein each of the optical fibers is disposed in a respective passageway of the first and second substrates; and
a bonding agent to secure the fibers and substrates in fixed relation to one another;
wherein the fibers are oriented at a selected, non-perpendicular angle relative to the first surface of the substrate.

3. The fiber array according to claim 1, wherein the angle is from 0 degrees to 12 degrees.

4. The fiber array according to claim 1, wherein the angle is from 4 degrees to 8 degrees.

5. A fiber array comprising:
a plurality of optical fibers;
a first silicon substrate comprising a first plurality of fiber passageways extending therethrough from a first surface of the substrate;
a second silicon substrate comprising a second plurality of fiber passageways extending therethrough, wherein each of the optical fibers is disposed in a respective passageway of the first and second substrates;
a third silicon substrate comprising a third plurality of fiber passageways extending therethrough, wherein each of the optical fibers is disposed in a respective passageway of the third substrate; and
a bonding agent to secure the fibers and substrates in fixed relation to one another;
wherein the fibers are oriented at a selected, non-perpendicular angle relative to the first surface of the substrate.

6. The fiber array according to claim 1, wherein the first and second substrates are in facing contact.

7. The fiber array according to claim 1, wherein the passageways of the first substrate have a cross-sectional dimension that increases along a portion of the length of the passageway.

8. The fiber array according to claim 1, wherein the portions of the fibers disposed in the first substrate comprise un-buffered, un-jacketed fiber segments.

9. The fiber array according to claim 1, comprising a housing having a registration feature for registering the first substrate relative to the second substrate to position the fibers at the selected angle.

10. The fiber array according to claim 1, wherein the first and second substrates are positionable relative to one another so that the first and second plurality of passageways provide sufficient clearance to permit the fibers disposed therein to be positioned at a range of angles within the passageways.

11. A method for fabricating a fiber optic array, comprising:
providing a first substrate comprising a first plurality of fiber passageways extending therethrough from a first surface of the substrate;
providing a second substrate comprising a second plurality of fiber passageways extending therethrough;
positioning the second substrate relative to the first substrate so that each passageway of the first substrate is registered to a respective passageway of the second substrate;
placing an optical fiber in each of the registered passageways, wherein the passageways are dimensioned to permit the optical fibers disposed therein to be positioned at a range of angles relative to the first surface of the substrate;
moving the second substrate relative to the first substrate so as to orient the fibers at a selected non-orthogonal angle relative to the first surface of the substrate; and
securing the fibers and the substrates to one another with a bonding agent,
whereby a fiber array is provided in which the fibers are oriented at the selected, non-orthogonal angle relative to the first surface of the first substrate.

12. The method according to claim 11 wherein applying a bonding agent comprises applying a sufficient quantity of bonding agent to substantially fill voids around the fibers within the passageways.

13. The method according to claim 11 wherein placing an optical fiber in each of the registered passageways comprises placing an endface of the fiber adjacent an output face of the array.

14. The method according to claim 11 comprising polishing the endfaces of each of the fibers to be parallel to the output face of the array.

* * * * *